United States Patent
Horiuchi et al.

(10) Patent No.: US 7,970,344 B2
(45) Date of Patent: Jun. 28, 2011

(54) WIRELESS COMMUNICATION APPARATUS, WIRELESS COMMUNICATION METHOD AND WIRELESS COMMUNICATION SYSTEM

(75) Inventors: Ayako Horiuchi, Osaka (JP); Akihiko Nishio, Osaka (JP); Kenichi Miyoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 758 days.

(21) Appl. No.: 11/722,616

(22) PCT Filed: Dec. 21, 2005

(86) PCT No.: PCT/JP2005/023478
§ 371 (c)(1),
(2), (4) Date: Jun. 22, 2007

(87) PCT Pub. No.: WO2006/070665
PCT Pub. Date: Jul. 6, 2006

(65) Prior Publication Data
US 2008/0305740 A1    Dec. 11, 2008

(30) Foreign Application Priority Data
Dec. 27, 2004 (JP) .................... 2004-377095

(51) Int. Cl.
*H04B 7/15* (2006.01)
*H04J 1/10* (2006.01)
*H04B 7/185* (2006.01)
(52) U.S. Cl. .............. 455/11.1; 370/315; 370/316
(58) Field of Classification Search .......... None
See application file for complete search history.

(56) References Cited

U.S. PATENT DOCUMENTS

| | | | | |
|---|---|---|---|---|
| 4,723,283 A | * | 2/1988 | Nagasawa et al. | 380/240 |
| 5,708,966 A | * | 1/1998 | Al-Dhahir et al. | 455/13.4 |
| 6,128,763 A | * | 10/2000 | LoGalbo et al. | 714/774 |
| 6,459,881 B1 | * | 10/2002 | Hoder et al. | 455/11.1 |
| 7,072,612 B2 | * | 7/2006 | Soliman | 455/13.1 |
| 7,185,090 B2 | * | 2/2007 | Kowalski et al. | 709/224 |
| 7,702,280 B2 | | 4/2010 | Takeda et al. | |

(Continued)

FOREIGN PATENT DOCUMENTS
CN        1547862 A    11/2004
(Continued)

OTHER PUBLICATIONS

English translation version of JP-06120859, A (1994) as cited on IDS submitted by applicant on Jun. 22, 2007.*

(Continued)

*Primary Examiner* — Yuwen Pan
*Assistant Examiner* — Ayodeji Ayotunde
(74) *Attorney, Agent, or Firm* — Pearne & Gordon LLP

(57) ABSTRACT

The objective of the present invention is to suppress an increase in the power consumption for the relaying of signals. A relay station unit 150 is a relay station unit that has as a function the relaying of a signal, and includes: a wireless receiving unit 15; a relay determination unit 23, for determining that a signal received by the wireless receiving unit 15 does not satisfy a predetermined quality, and for permitting reception of a signal from a different relay station unit; a synthesizing unit 18, for generating a transmission signal based on a signal received from a base station unit and a signal received from the different relay station unit; and a wireless transmitting unit 13, for transmitting the signal that is generated.

21 Claims, 10 Drawing Sheets

U.S. PATENT DOCUMENTS

| | | |
|---|---|---|
| 2001/0018328 A1* | 8/2001 | Ohkura et al. .................. 455/15 |
| 2003/0063607 A1* | 4/2003 | Adachi et al. .................. 370/389 |
| 2004/0102219 A1* | 5/2004 | Bunton et al. ................. 455/560 |
| 2004/0229563 A1 | 11/2004 | Fitton et al. |
| 2004/0242154 A1 | 12/2004 | Takeda et al. |
| 2007/0178831 A1 | 8/2007 | Takeda et al. |
| 2007/0224931 A1 | 9/2007 | Fitton et al. |

FOREIGN PATENT DOCUMENTS

| | | |
|---|---|---|
| JP | 06-120859 | 4/1994 |
| JP | 07023464 A | 1/1995 |
| JP | 2000-232675 | 8/2000 |
| JP | 2001-189971 | 7/2001 |
| JP | 2001-244864 | 9/2001 |
| JP | 2002026923 A | 1/2002 |
| JP | 2003-229798 | 8/2003 |
| JP | 2004254308 A | 9/2004 |

OTHER PUBLICATIONS

English translation version of JP-2000232675,A as cited on IDS submitted by applicant on Jun. 22, 2007.*

English translation version of JP-2003229798,A as cited on IDS submitted by applicant on Jun. 22, 2007.*

Chinese Office action for Appl. No. 200580045146.7 dated Jun. 22, 2010.

* cited by examiner

WIRELESS COMMUNICATION APPARATUS, WIRELESS COMMUNICATION METHOD AND WIRELESS COMMUNICATION SYSTEM

TECHNICAL FIELD

The present invention relates to a wireless communication apparatus, a wireless communication method and a wireless communication system.

BACKGROUND ART

Recently, for the multimedia processing of information employed for a communication system that uses mobile cellular terminals, as typified by mobile phones or the like, the transmission not only of audio data but also of large volumes of data for static pictures, moving pictures, etc., has come to be commonly accepted. In order to provide for the transmission of large volumes of data, methods for employing high frequency wireless bands to obtain high transmission rates have been frequently discussed.

However, in cases wherein high frequency wireless bands are used, while high transmission rates can be expected over short distances, attenuation due to transmission distances is excessive. Therefore, the area covered by each base station is reduced, and many more base stations must be installed. Since considerably high costs are involved in the installation of a base station, a technique whereby an increase in the number of base stations is prevented, and a communication service can be provided, has been strongly demanded.

Conventional art related to this is exemplified, for example, by a technique described in patent document 1. According to the conventional art in patent document 1, in order to improve diverse effects, a reception signal is synthesized that employs both a communication network, established between a base station and a mobile station via a cellular, dedicated wireless channel, and an adhoc network formed between mobile stations. Further, the conventional art discloses a technique whereby, in a case wherein a relay station detects an error in a received signal, the relay station abandons the relay signal and issues a retransmission request to a base station, and whereby, in a case wherein an error is not found in a signal that is received again, the relay station relays the signal to the mobile station. And a technique is disclosed whereby, even in a case wherein the relay station detects an error in a received signal, the relay terminal relays the signal to a mobile station, unconditionally.

Patent Document 1: JP-A-2001-189971

DISCLOSURE OF THE INVENTION

Problems that the Invention is to Solve

However, according to the conventional method, a problem is that a relay station frequently issues retransmission requests, and each time the relay station issues a retransmission request, or performs reception and relay processes relative to a request, the consumption of power is increased.

The present invention is provided while taking this point into account, and one objective of the invention is to provide a wireless communication apparatus, a wireless communication method and a wireless communication system that reduce the number of transmissions made to a wireless communication apparatus for relaying signals, so as to prevent increases in the consumption of power.

Means for Solving the Problems

A wireless communication apparatus according to the present invention is a communication apparatus for relaying data, comprising:
a receiving unit;
a receiving unit when the first data received by the receiving unit does not satisfy a predetermined quality, which receives first data transmitted by an another communication apparatus; and
a transmitting unit which transmits the first data received from the another communication apparatus.

According to the above arrangement, in a case wherein the first data received by the receiving unit does not satisfy the predetermined quality, the first data can be received from the other communication apparatus and be relayed, so that transfers of errors can be reduced.

Further, a wireless communication apparatus according to the present invention is a communication apparatus for relaying data, comprising:
a receiving unit;
a determination unit which determines the quality of first data received by the receiving unit;
a waiting unit which waits without issuing a retransmission request;
a determination unit which determines the quality of first data received from an another communication apparatus; and
a transmitting unit which transmits the first data received from the another communication apparatus.

According to the above arrangement, the reception quality of the first data received by the receiving unit can be determined, and without a retransmission request being issued, the process can be on standby in order to receive the first data from another receiving unit.

Furthermore, a wireless communication apparatus according to the present invention comprises:
a receiving unit which receives first data transmitted from a base station;
a decoding unit which decodes the first data;
a receiving unit, when the first data does not satisfy a predetermined quality, which receives first data transmitted from an another communication apparatus;
a decoding unit which decodes a first signal transmitted from the another communication apparatus; and
a transmitting unit which transmits the first data and first data transmitted by the another communication apparatus.

According to the above configuration, the reception quality can be determined after the first data has been decoded.

In addition, a wireless communication apparatus according to the present invention comprises:
a receiving unit which receives first data transmitted from a mobile station;
a decoding unit which decodes the first data;
a receiving unit, when the first data does not satisfy a predetermined quality, which receives first data transmitted by an another communication apparatus;
a decoding unit which decodes the first data transmitted from the different communication apparatus; and
a transmitting unit which transmits the first data and the first data transmitted from the another communication apparatus.

The wireless communication apparatus of the present invention further comprises:
a signal generating unit which synthesizes the first data with the first data transmitted from the another communication apparatus.

According to the above arrangement, since a plurality of sets of first data are synthesized for transmission, an improvement in the reception quality of the first data can be obtained.

The wireless communication apparatus of the present invention further comprises:

a determination unit which issues an instruction to the transmitting unit to transmit the first data only when the first data satisfies the predetermined reception quality.

According to the above arrangement, since the first data is not transmitted when the first data does not satisfy the predetermined reception quality, transmission power required by the wireless communication apparatus can be reduced.

The wireless communication apparatus of the present invention further comprises:

a determination unit which issues an instruction to the transmitting unit for transmission of the first data only when the first data generated by the signal generating unit satisfies a predetermined reception quality.

According to the above arrangement, since the first data generated by the signal generating unit is not transmitted when the first data does not satisfy the predetermined reception quality, transmission power required by the wireless communication apparatus can be reduced.

The wireless communication apparatus of the present invention further comprises:

a selecting unit which selects any signal from the first data and the first data transmitted from the another communication apparatus.

According to the above arrangement, compared with a case wherein the first data is generated using a plurality of sets of first data, the wireless communication apparatus can be simplified.

The wireless communication apparatus of the present invention further comprises:

a selecting unit which compares the reception quality of the first data with that of the first data transmitted from the another communication apparatus to select a signal having the highest reception quality.

According to the above arrangement, a signal can be selected for the transmission of the first data having the highest reception quality.

Also, for the wireless communication apparatus of the present invention, a CRC is performed to examine the quality of the data.

According to the above arrangement, an error determination for data can be performed.

And for the wireless communication apparatus of the present invention, when the first data transmitted from an another communication apparatus can not be received within a predetermined period of time, a retransmission request is issued.

According to the above arrangement, in a case wherein the first data transmitted by the other communication apparatus can not be received, retransmission can be requested, without having to be kept waiting for the first data.

Further, for the wireless communication apparatus of the present invention, when the first data transmitted from an another communication apparatus can not be received within a predetermined period of time, a transmission instruction is issued to the transmitting unit to transmit the first data.

According to the above arrangement, even in a case wherein the first data does not satisfy the predetermined reception quality, a relay can be performed.

Furthermore, a wireless communication method according to the present invention is a communication method, for a communication apparatus for relaying data, comprising:

receiving first data;

receiving first data transmitted from an another communication apparatus when the first data does not satisfy a predetermined quality; and transmitting the first data received from the another communication apparatus.

In addition, a wireless communication method according to the present invention comprises:

transmitting first data from a base station to a first relay station and a second relay station;

receiving the first data by the first relay station and the second relay station;

determining the quality of the first data received by the first relay station;

determining the quality of the first data received by the second relay station;

waiting without issuing a retransmission request to the base station when the first data does not satisfy a predetermined quality in the first relay station;

transmitting the first data to the first relay station and a terminal when the first data satisfies a predetermined quality in the second relay station; and transmitting the first data to the terminal when the first relay station receives the first data.

In addition, a wireless communication system according to the present invention is a communication system, comprising:

a base station;

a first relay station;

a second relay station; and a terminal, wherein the base station transmits first data to the first relay station and the second relay station, wherein the first relay station and the second relay station receive the first data transmitted from the base station, wherein the first relay station and the second relay station decode the first data transmitted from the base station, wherein, when the first data received from the base station does not satisfy a predetermined quality in the first relay station, the first relay station waits without issuing a retransmission request to the base station, wherein, when the first data transmitted from the base station satisfies a predetermined quality in the second relay station, the second relay station transmits to the first relay station and the terminal the first data transmitted from the base station, wherein the first relay station receives the first data transmitted from the second relay station, wherein the first relay station decodes the first data transmitted from the second relay station, wherein, when the first data transmitted from the second relay station satisfies a predetermined quality in the first relay station, the first relay station generates first data based on the first data transmitted from the second relay station and the first data transmitted from the base station;

wherein the first relay terminal transmits the first data to the terminal, wherein the terminal receives, through the second relay station, the first data transmitted from the base station;

wherein the terminal receives the first data from the first relay station, wherein the terminal decodes the first data transmitted from the base station through the second relay station, and wherein the terminal decodes the first data received from the first relay station.

Moreover, a wireless apparatus according to the present invention comprises:

a receiving unit which receives a signal;

a transmission signal generating unit which generates a transmission signal based on at least one of a first signal received by the receiving unit and a relay signal for the first signal;

a transmitting unit which transmits a signal; and a determination unit, which issues an instruction to the receiving unit to receive a relay signal for the first signal when the transmission signal does not satisfy a predetermined reception quality, or which issues an instruction to the transmitting unit to transmit the transmission signal when the transmission signal satisfies the predetermined reception signal quality.

According to this configuration, in a case wherein the first signal received by the receiving unit does not satisfy the predetermined quality, another first signal that is relayed can be received, and a transmission signal can be generated and relayed, so that transfers of errors can be reduced.

The communication apparatus of the present invention further comprises:

a determination unit, when the transmission signal does not satisfy the predetermined reception quality continuously a predetermined number of times or more, which issues a retransmission request.

With this arrangement, a reduction in retransmission requests is enabled.

The communication apparatus of the present invention further comprises:

a determination unit, when the transmission signal does not satisfy the predetermined reception quality continuously a predetermined number of times or more, which issues an instruction to the transmitting unit for transmission of the transmission signal.

With this arrangement, a reduction in retransmission requests is enabled.

Advantages of the Invention

According to the present invention, when it is determined that the first data received by receiving unit does not satisfy a predetermined quality, the first data is also received from another communication apparatus, and a plurality of sets of first data are employed to generate first data for transmission. Thus, in a case wherein the quality of a relay signal does not satisfy a quality, the signal relay is enabled without a retransmission request being issued. Therefore, the number of transmissions can be reduced, and an increase in power consumed can be suppressed.

Figure 1:
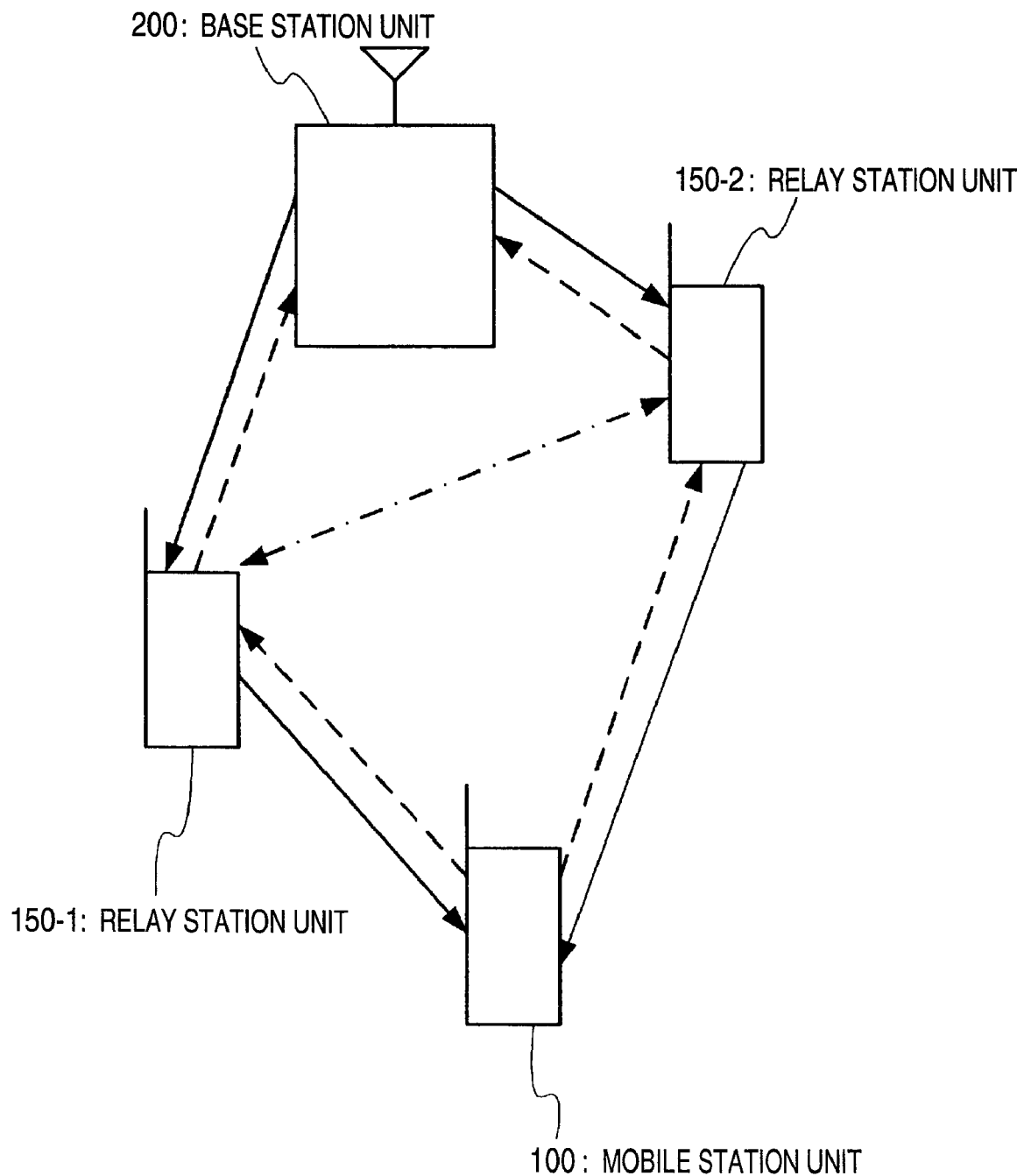
FIG. 1 A configuration diagram for a mobile communication system according to a first embodiment.

DESCRIPTION OF REFERENCE NUMERALS AND SIGNS 21, 41: relay control unit
22, 42: relay signal extraction unit
23, 43: relay determination unit
44: buffer unit

BEST MODES FOR CARRYING OUT THE INVENTION

The embodiments of the present invention will now be described in detail while referring to the accompanying drawings. A wireless communication apparatus explained below has a function for relaying signals, and that, for example, is mounted on a wireless relay station unit employed for a mobile communication system.

The following explanation will be given for a case wherein, for example, the wireless communication apparatus of the present invention is employed as a relay station unit that relays, to a mobile station unit, a signal transmitted by a base station unit.

Also, an explanation will be given for a case wherein a different communication apparatus is also employed as a relay station unit that relays, to the mobile station unit, a signal transmitted by the base station unit.

The individual signals are wireless waves for transmitting the same data. Since the signals receive different fading affects in accordance with the conditions of wireless transmission paths, the amplitudes and phases of the signals have different changes.

First Embodiment

As shown in FIG. 1, a mobile communication system according to this embodiment includes a mobile station unit 100, a relay station unit 150-1, a relay station unit 150-2 and a base station unit 200. The relay station unit 150-1 and the relay station unit 150-2 include the same function, and are also simply called relay station units 150.

The base station unit 200 transmits a signal addressed to the mobile station unit 100 to the relay station unit 150-1 and the relay station unit 150-2. The relay station unit 150-1 and the relay station unit 150-2 relay, to the mobile station unit 100, relay signals that are received from the base station unit 200 and are addressed to the mobile station unit 100. The mobile station unit 100 receives, from the relay station unit 150-1 and the relay station unit 150-2, the signals addressed to the mobile station unit 100.

The base station unit 200 selects a relay station unit that can communicate with another relay station unit. An example selection method will be explained below. First, a plurality of wireless communication apparatuses, which are relay station unit choices, notify the base station unit 200 of the reception qualities relative to the surrounding wireless communication apparatuses. Then, the base station unit 200 selects relay station units which satisfy a predetermined reception quality at which the mobile station unit receives a signal from a relay station unit. Of the selected relay station units, the one providing the reception quality, relative to the relay station unit, is selected. In this embodiment, the base station unit 200 selects the relay station unit 150-1 and the relay station unit 150-2 as relay station units, and issues an instruction for the relay of a signal to the mobile station unit 100. Also, the base station unit can communicate with the relay station unit 150-1 and the relay station unit 150-2, and these two relay station units notify the base station unit of the relay of a relay signal addressed to the mobile station unit 100.

The base station unit 200 stores correlation information for identification information for the mobile station unit 100 and the relay units, and the relay station units 150 store identification information for a target mobile station unit 100 for relaying. Further, the mobile station unit 100 may store identification information for the relay station units 150.

In this embodiment, the relay station units measure the reception quality of a relay signal. Error detection is performed as one method for measuring the reception quality. When, as a result of an error detection, it is determined that an error is present (the relay signal does not satisfy a predetermined quality), the relay station unit receives a relay signal transmitted by a different relay station, synthesizes a relay signal received from the different relay station with a relay signal received from the base station, and relays the synthesized relay signal to the mobile station unit. When, as the result of an error detection, it is determined that no error is present, the relay station unit relays a relay signal to the mobile station unit. The cyclic redundancy check (CRC), vertical parity check, horizontal parity check, Hamming code method or the like may be employed as an error detection method, and in this embodiment, the CRC is employed, as an example.

Figure 2:
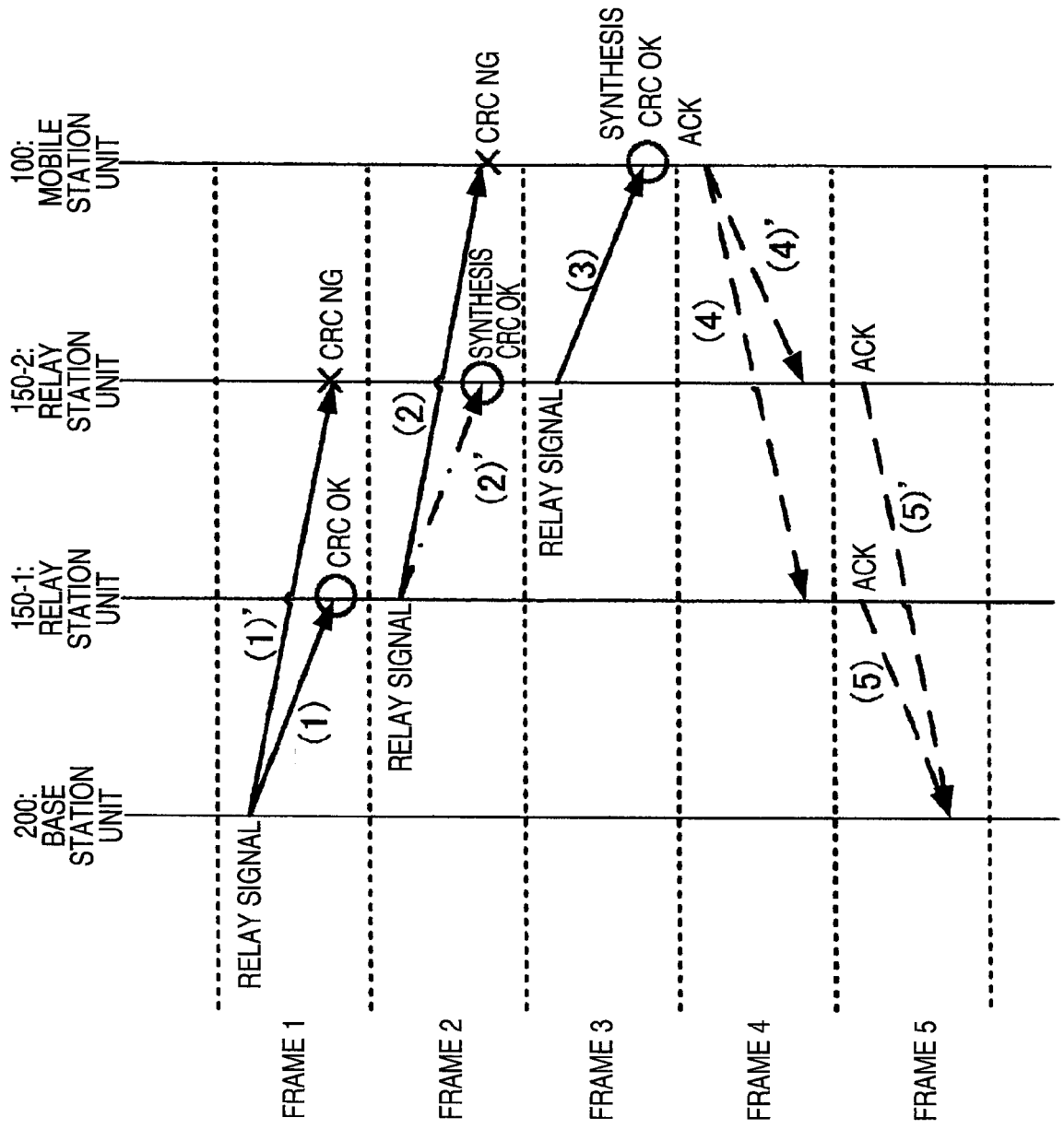
FIG. 2 A sequence diagram according to the first embodiment.
Figure 3:
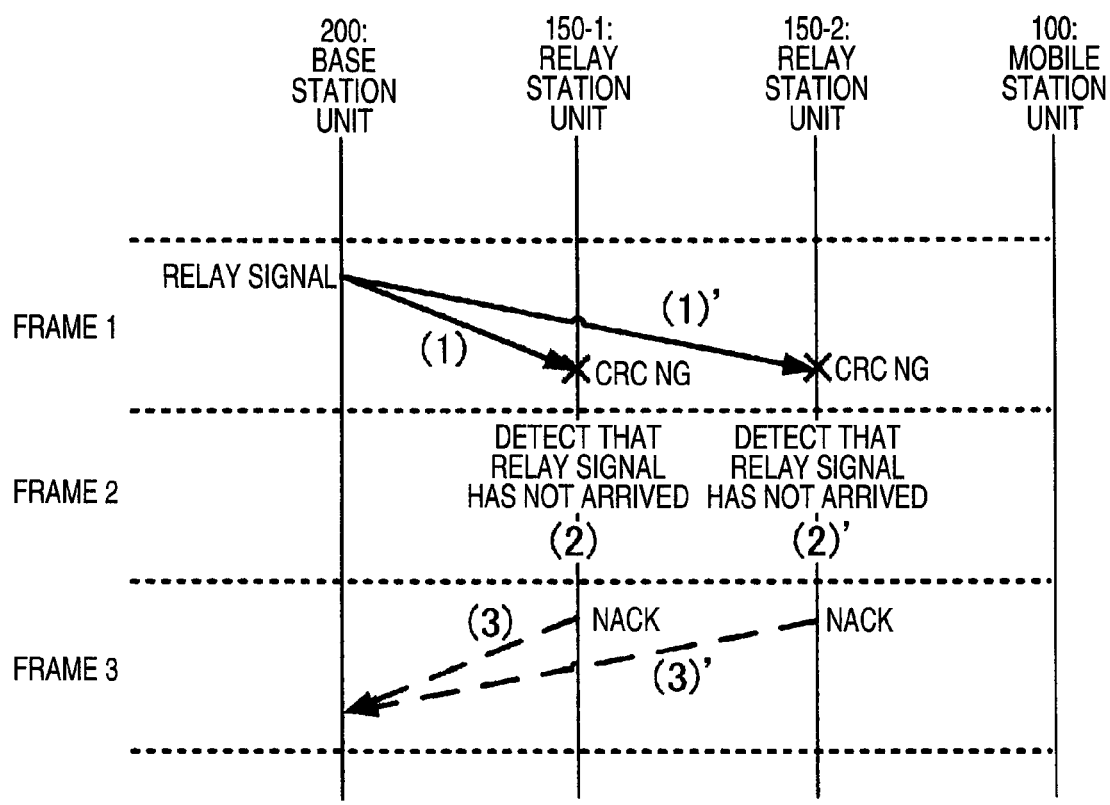
FIG. 3 A sequence diagram according to the first embodiment.

The relay process in this embodiment will now be described while referring to the sequence diagrams in FIGS. 2 and 3.

While referring to FIG. 2, an explanation will be given for a case wherein OK is the result obtained by a CRC of a relay signal received by the relay station unit 150-1, and NG is the result obtained by a CRC of a relay signal received by the relay station unit 150-2.

In frame 1, the base station unit 200 transmits, to the relay station unit 150-1 and the relay station 150-2, a relay signal addressed to the mobile station unit 100 (process (1), (1)'). The relay station units 150-1 and the relay station unit 150-2 perform a CRC for the received relay signals. Since the CRC result for the relay station unit 150-1 is OK, in frame 2, the relay station unit 150-1 transmits a relay signal to the mobile station unit 100 (process (2)). Since the CRC result is NG for the relay station unit 150-2, in frame 2, the relay station unit 150-2 does not transmit a relay signal to the mobile station unit 100. In order to correct the relay signal, for which the CRC is NG, the relay station unit 150-2 wait to receive a signal from the relay station unit 150-1 (equivalent to a signal from the relay station unit 150-2). The relay station unit 150-2 in the waiting state receives a relay signal that is transmitted by the relay station unit 150-1 and addressed to the mobile station unit 100 (process (2)'). The relay station unit 150-2 synthesizes the relay signal received from the relay station unit 150-1 in frame 2 with the relay signal received from the base station unit 200 in frame 1. When OK is obtained as the result obtained by the CRC for the synthesized signal, the relay signal obtained in frame 3 is transmitted to the mobile station unit 100 (process (3)).

In frame 2, the mobile station unit 100 performs a CRC for a reception signal received from the relay station unit 150-1. When the CRC result for the received signal is NG, in the next frame, the mobile station unit 100 tries to receive a relay signal from another relay station unit. In frame 3, the mobile station unit 100 receives a relay signal from the relay station unit 150-2. The signal received from the relay station unit 150-1 in frame 2 is synthesized with the signal received from the relay station unit 150-2 in frame 3. When the CRC result for the synthesized signal is OK, in frame 4, an ACK, indicating the signal has been correctly received, is transmitted to the relay station unit 150-1 and the relay station unit 150-2 (process (4), (4)'). Upon receiving the ACK, in frame 5, the two relay station units transmit the ACK to the base station unit 200 (process (5), (5)').

With this arrangement, even when NG is the result obtained by the CRC for the relay signal received by the relay station unit 150-2 in frame 1, the relay station unit 150-2 can receive a relay signal from the relay station unit 150-1, and can generate a relay signal having no error by synthesizing the relay signals.

While referring to FIG. 3, an explanation will be given for a case wherein NG is the result obtained by a CRC for a relay signal received by the relay station unit 150-1, and NG is the result obtained by a CRC for a relay signal received by the relay station unit 150-2.

In frame 1, the base station unit 200 transmits a relay signal to the relay station unit 150-1 and the relay station unit 150-2 (process (1), (1)'). The relay station unit 150-1 and the relay station unit 150-2 each perform a CRC for the received relay signals. Since the CRC result obtained by the relay station unit 150-1 is NG, in frame 2, the relay station unit 150-1 does not transmit the relay signal to the mobile station unit 100. In order to correct the relay signal for which the CRC result is NG, the relay station unit 150-1 waits to receive a relay signal from the relay station unit 150-2. However, since the CRC result obtained by the relay station unit 150-2 is also NG, in frame 2, the relay station unit 150-2 does not transmit the relay signal to the mobile station unit 100 and waits to receive the relay signal from the relay station unit 150-1. Therefore, both of the relay station units 150 are in the waiting state instead of transmitting a relay signal, and can not receive a relay signal. Because a signal can not be received, each of the relay station unit 150 detects that the CRC result obtained by the other relay station unit for a relay signal is NG (process (2), (2)'). For the detection, a detection method for measuring reception power during a frame period and comparing the power with a threshold, for example, is employed. When the relay station unit 150-1 and the relay station unit 150-2 have detected that a relay signal can not be received, the relay station units 150 transmit, to the base station unit 200, an NACK, indicating that an error is present in a received signal.

As described above, when the relay station unit detects that a relay signal can not be received from another relay station unit, it is understood that NG is the CRC result obtained by all the relay station units for the relay signal that are transmitted by the base station unit 200. Thus, each of the relay station units can transmit an NACK to the base station unit.

Figure 4:
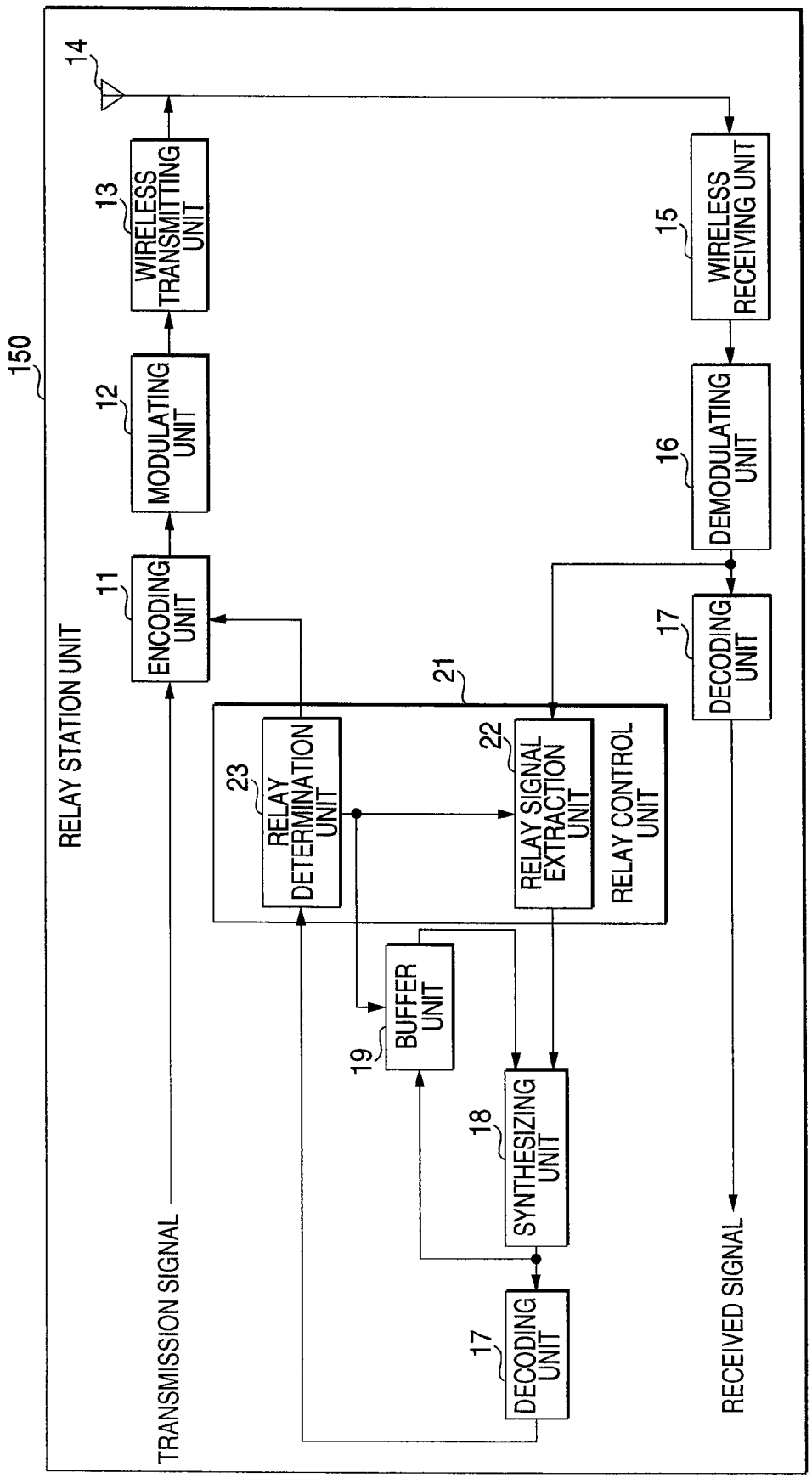
FIG. 4 A block diagram illustrating the arrangement of a relay station unit according to the first embodiment.

FIG. 4 is a block diagram showing the main configuration of the transmitter/receiver unit of the relay station unit according to this embodiment. The individual sections of the relay station unit perform the following operations. The frame timing for receiving or transmitting a relay signal is determined by a base station or a higher control station, and is transmitted to the relay station units 150 in advance.

An antenna 14 is used to receive a wireless signal from another wireless apparatus, and for transmitting a wireless signal from a relay station unit. A wireless receiving unit 15 receives a signal received at the antenna, and performs wireless processing, such as down conversion to obtain a baseband signal. A received signal is transmitted to a demodulating unit 16. The demodulating unit 16 divides an input received signal by a transfer path estimated value, and restores the original signal, from which the affects of amplitude and phase fluctuations due to a transfer path are removed. The restored signal is transmitted to a decoding unit 17. The decoding unit 17 decodes the received signal that is modulated into a QPSK or 16QAM, and outputs the resultant received signal.

An encoding unit 11 performs encoding, such as turbo coding for a time-series transmission signal or channel information that is input, and transmits the coded transmission signal to a modulating unit 12. The modulating unit 12 performs modulation, such as QPSK or 16QAM, for the transmission signal. The modulated transmission signal is transmitted to a wireless transmitting unit 13. The wireless transmitting unit 13 performs wireless processing, such as up conversion of a transmission signal, and transmits the signal through the antenna.

Next, a relay control unit 21 and the relay processing will be described. The relay control unit 21 includes a relay signal extraction unit 22 and a relay determination unit 23. The relay signal extraction unit 22 extracts, from a received signal, a relay signal addressed to the mobile station unit 100. The extracted relay signal is input to a synthesizing unit 18. The synthesizing unit 18 synthesizes a signal received from the relay signal extraction unit 22 with a signal that is stored in a buffer unit 19 in correlation with the input from the relay signal extraction unit 22. The synthesized signal is transmitted to the decoding unit 17 and the buffer unit 19. The decoding unit 17 decodes the relay signal. The decoded relay signal is transmitted to the relay determination unit 23. The relay determination unit 23 performs a CRC and when the CRC result is OK, determines that relaying should be performed, or when the CRC result is NG, determines that relaying should not be performed. The determination result is transmitted to the buffer unit 19 and the relay signal extraction unit 22. In a case wherein it is determined that transmission should be performed, a relay signal is input to the encoding unit 11 to instruct the clearance of a signal that is correlated with a signal stored in the buffer unit 19. In a case wherein it is determined transmission is not to be performed (in a case wherein it is determined that a relay signal does not satisfy a predetermined quality), the relay signal is abandoned, and an instruction is issued to the relay signal extraction unit 22 to again extract a corresponding relay signal.

Figure 5:
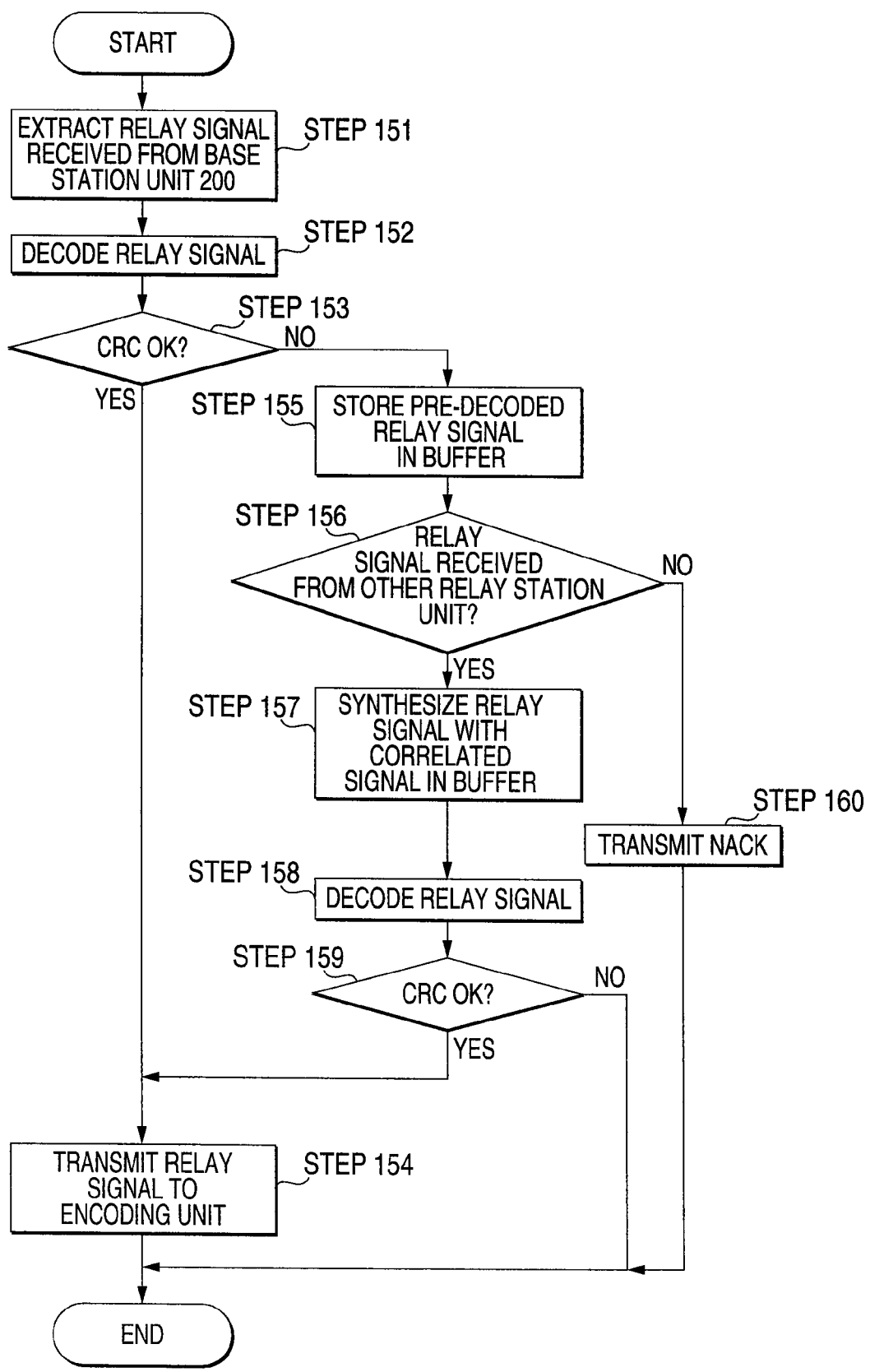
FIG. 5 A flowchart for the relay processor of the relay station unit according to the first embodiment.

FIG. 5 is a flowchart for the relay processing performed by the relay station unit explained using the block diagram.

At step 151, the relay signal extraction unit 22 extracts a relay signal received from the base station unit 200. Extraction of a relay signal may be determined by employing identification information, such as an ID indicated in the header of a received signal, or in accordance with a timing, by referring to scheduling information transmitted in advance by the base station. At step 152, the decoding unit 17 decodes the relay signal. At step 153, the relay determination unit 23 performs a CRC for the relay signal. When the CRC result is OK, at step 154, the relay signal is input to the encoding unit 11. When the CRC result is NG, at step 155, the relay signal in the pre-decoded state is stored in the buffer unit 19, and an instruction is issued to the relay signal extraction unit 22 to extract a relay signal transmitted by the other relay station unit. For the extraction of a relay signal received from the relay station unit, as well as for a signal received from the base station unit 200, the relay signal extraction unit 22 may perform a determination using identification information, such as an ID indicated in the header of a received signal, or in accordance with a timing, by referring to scheduling information transmitted in advance by the base station. At step 156, in a case wherein the relay signal extraction unit 22 could extract a relay signal from the other relay station unit, the process advances to step 157. In a case wherein a relay signal can not be received, the process is shifted to step 160. As a method for determining whether the extraction is successful, a method for measuring reception power during a frame period and comparing the power with a threshold, for example, is employed. At step 157, the synthesizing unit 18 synthesizes a relay signal received from the other relay unit with a relay signal that is received from the other base station unit and stored in the buffer unit 19 in correlation with that relay signal. A correlation of signals may be determined by using identification information, such as an ID indicated in the header of a received signal, or in accordance with timing, by referring to scheduling information that is transmitted in advance by the base station. At step 158, the decoding unit 17 decodes the relay signal. At step 159, as well as at step 153, the relay determination unit 23 performs a CRC for the relay signal. When the CRC result is OK, at step 154, the relay signal is input to the encoding unit 11. When the CRC is NG, the relay signal is not transmitted. Further, at step 160, it is detected that a relay signal from the other relay station unit has not been received, and an NACK is transmitted to the base station unit 200.

Figure 6:
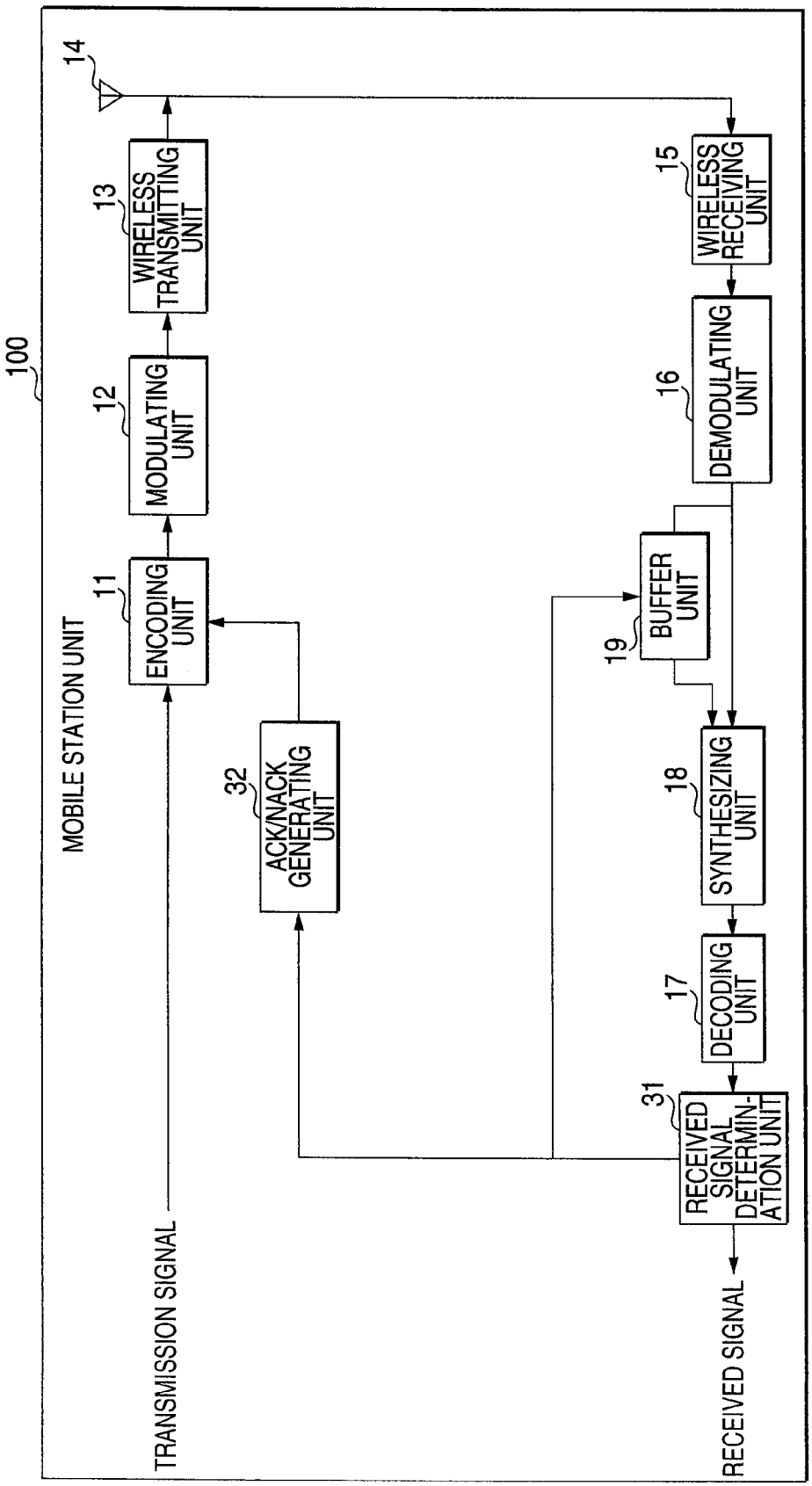
FIG. 6 A block diagram illustrating the arrangement of a mobile station unit according to the first embodiment.

FIG. 6 is a block diagram showing the main configuration of the transmitter/receiver of the mobile station unit 100 according to this embodiment. The individual sections of the mobile station unit perform the following operations. Assume that a frame timing for receiving a relay signal is determined by a relay station unit, a base station unit or a higher control station, and is transmitted to the mobile station unit 100 in advance. The same reference numerals are provided for the same structures as in FIG. 4, and no further explanation for them will be given.

A received signal determination unit 31 performs a CRC. In a case wherein the CRC result for a received signal is OK, the CRC result is input to an ACK/NACK generating unit 32. In a case wherein the CRC result is NG, when the check for the received signal is performed the first time, the received signal is stored in a buffer unit 19, without transmitting the result to the ACK/NACK generating unit 32. This is because it is possible that there may be received a relay signal, such as a relay signal transmitted by the relay station unit 150-2 in frame 3 in FIG. 2, that is transmitted with a delay because the CRC result of a relay signal is NG the first time, and that this signal is synthesized with a signal transmitted by the other relay station unit. When a relay signal that is transmitted with a delay is received, a signal stored in the buffer unit 19 can be synthesized with a relay signal transmitted by the other relay station unit. When a relay signal that is received with a delay is demodulated by the demodulating unit 16, a signal stored in the buffer unit 19 is input to the synthesizing unit 18. The synthesizing unit 18 synthesizes the relay signal output by the demodulating unit 16 with the correlated signal stored in the buffer unit 19 and the synthesized signal is again transmitted to the demodulating decoding unit 17 and decoded, and the resultant signal is input to the received signal determination unit 31. The received signal determination unit performs the second CRC and transmits the CRC result to the ACK/NACK generating unit. The ACK/NACK generating unit generates an ACK or NACK in accordance with the input signal, and transmits the ACK or the NACK to the encoding unit 11.

Figure 7:
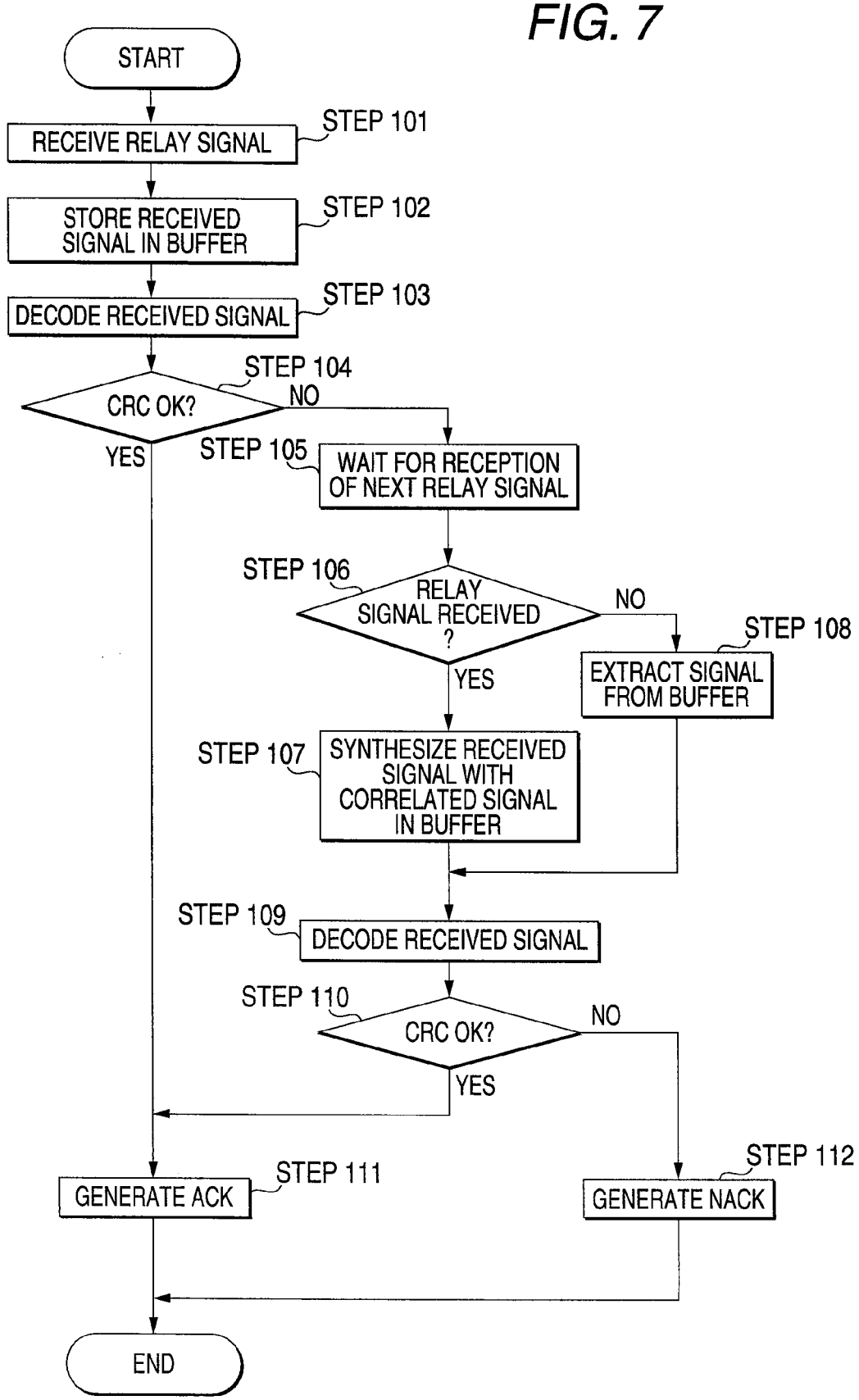
FIG. 7 A flowchart for the mobile station unit according to the first embodiment.

FIG. 7 is a flowchart for the mobile station unit 100 explained using the block diagram.

At step 101, a relay signal is received from the relay station unit. At step 102, the received signal is stored in the buffer unit 19. At step 103, the decoding unit 17 decodes the relay signal. At step 104, the received signal determination unit 31 performs a CRC. In a case wherein the CRC result is OK, the process is shifted to step 111. At step 111, the ACK/NACK generating unit 32 generates an ACK. In a case wherein the CRC result is NG at step 104, the process is shifted to step 105. At step 105, the process waits to receive the same signal from the relay station unit. After being on standby at step 105, the process is shifted to step 106. At step 106, a check is performed to determine whether a correlated relay signal could be received. Correlation of a signal may be determined using identification information, such as an ID indicated in the header of a received signal, or in accordance with a timing referring to scheduling information that is transmitted in advance from the base station. In a case wherein a correlated relay signal could be received, the process is shifted to step 107. When a correlated relay signal can not be obtained, the process is shifted to step 108. At step 107, the received signal is synthesized with a correlated signal that is stored in the buffer unit 19. At step 108, the relay signal is extracted from the buffer unit 19. Thereafter, at step 109, the decoding unit 17 decodes the received signal, and at step 110, the received signal determination unit 31 performs a CRC again. In a case wherein the CRC result is OK, at step 111, an ACK is generated. In a case wherein the CRC result is NG, at step 112, an NACK is generated.

As described above, according to this embodiment, instead of relaying a signal, for which the CRC result is NG, the relay station unit 150 synthesizes this signal with a relay signal received from the other relay station unit, and relays a signal for which the CRC result is OK. Therefore, the number of transmissions of a signal that includes an error is reduced. Thus, since the number of transmissions is reduced, the power consumed by the relay station unit 150 can be suppressed.

Second Embodiment

According to this embodiment, in a case wherein NG is the result obtained by performing a CRC for a signal that is obtained by synthesizing a relay signal received from a base station unit 200 with a relay signal received from the other relay station unit, a relay station unit 170 transmits the synthesized relay signal to a mobile station unit 100.

Figure 8:
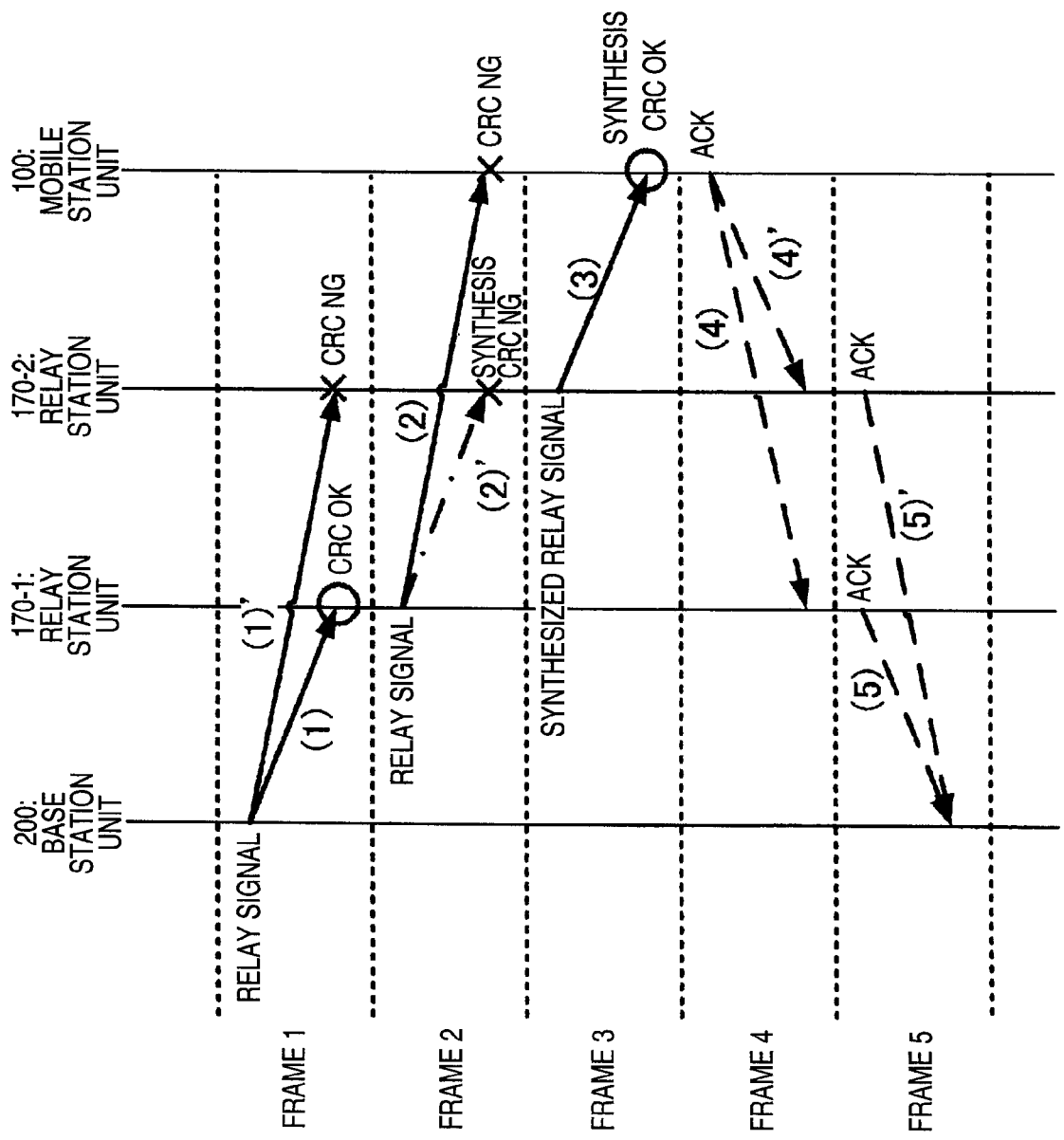
FIG. 8 A sequence diagram according to a second embodiment.

FIG. 8 is a sequence diagram of this embodiment. An explanation will be given for a case wherein, as well as in FIG. 2 for the first embodiment, OK is the CRC result for a relay signal received by a relay station unit 170-1, and NG is the CRC result for a relay signal received by a relay station unit 170-2.

In frame 1, the base station unit 200 transmits relay signals to the relay station unit 170-1 and the relay station unit 170-2 (process (1), (1)'). The relay station unit 170-1 and the relay station unit 170-2 perform a CRC for the received relay signals. Since the CRC result is OK for the relay station unit 170-1, in frame 2, the relay station unit 170-1 transmits the relay signal to the mobile station unit 100 (process (2)). Since the CRC result for the relay station unit 170-2 which is received from the base station unit 200 is NG, in frame 2, the relay station unit 170-2 waits for the reception of a signal from the relay station unit 1704-1, instead of transmitting the relay signal to the mobile station unit 100. The relay station unit 170-2 in the waiting state receives a relay signal transmitted by the relay station unit 170-1 (process (2)'). The relay station unit 170-2 synthesizes the relay signal received from the relay station unit 170-1 with the relay signal received from the base station unit 200 in frame 1. And since the CRC result for the synthesized signal is NG, in frame 3, the synthesized relay signal is transmitted to the mobile station unit 100 (process (3)). Then, since the CRC result for the signal the mobile station unit 100 received from the relay station unit 170-1 in frame 2 is NG, in frame 3, the mobile station unit 100 receives a relay signal again. Thereafter, the signal received from the relay station unit 170-1 in frame 2 is synthesized with the signal received from the relay station unit 170-1 in frame 3. And when the CRC result for the synthesized signal is OK, in frame 4, an ACK is transmitted to the relay station unit 170-1 and the relay station unit 170-2 (process (4), (4)'). Upon receiving the ACK, in frame 5, the two relay station units transmit the ACK to the base station unit 200 (process (5), (5)').

Figure 9:
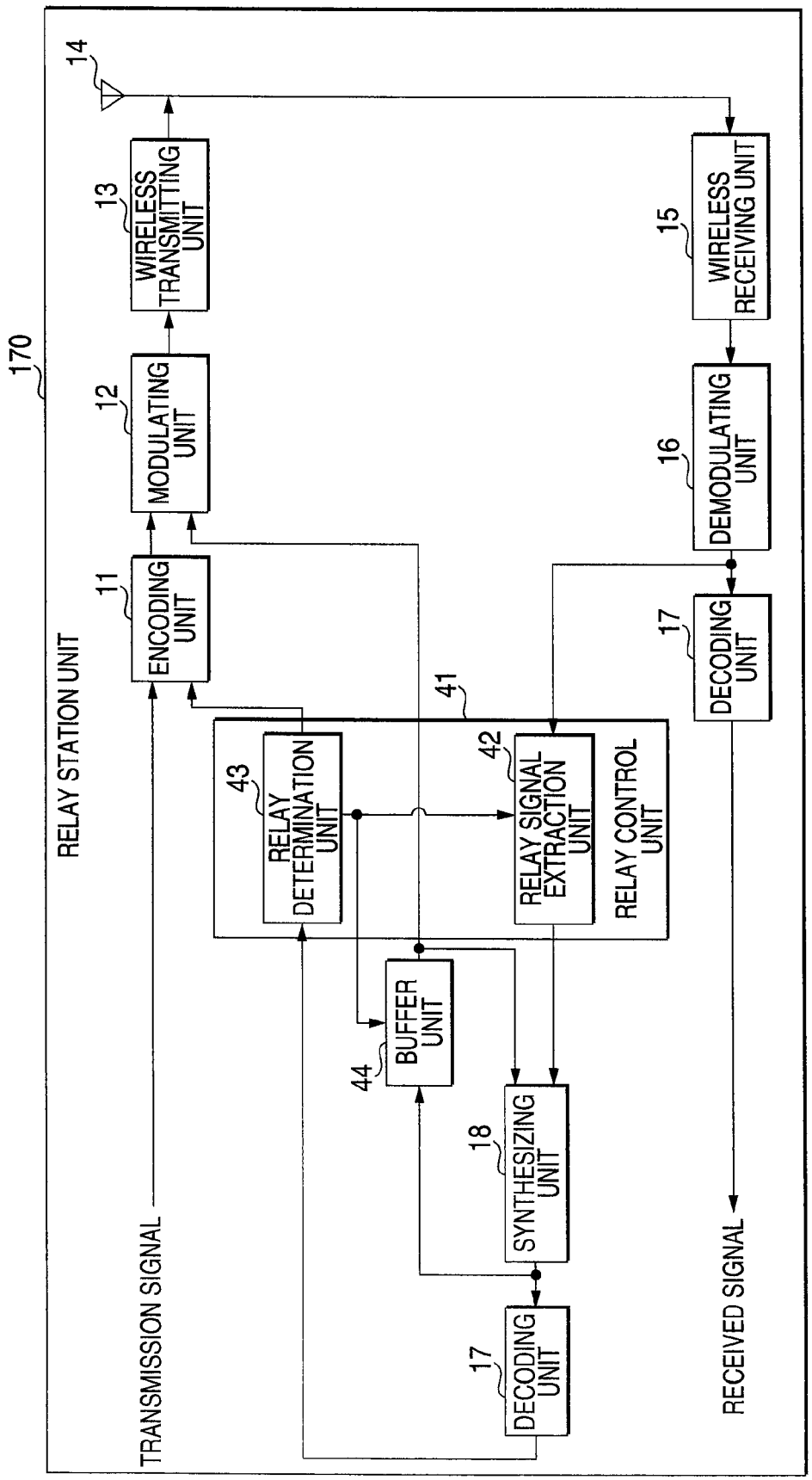
FIG. 9 A block diagram illustrating the arrangement of a mobile station unit according to the second embodiment.

FIG. 9 is a block diagram showing the main configuration of the transmitter/receiver of the relay station unit according to this embodiment. The same reference numerals are provided for the same structures as shown in FIG. 4, and no further explanation for them will be given.

A relay control unit 41 and the relaying processing will be explained. The relay control unit 41 includes a relay signal extraction unit 42 and a relay determination unit 43. The relay signal extraction unit 42 extracts, from a received signal, a relay signal addressed to the mobile station unit 100. The extracted relay signal is input to a synthesizing unit 18. The synthesizing unit 18 synthesizes a signal received from the relay signal extraction unit 42 with a signal that is stored in a buffer unit 44 in correlation with the input from the relay signal extraction unit 42. The synthesized signal is input to a decoding unit 17 and the buffer unit 44. The decoding unit 17 decodes a relay signal. The decoded relay signal is input to the relay determination unit 43. The relay determination unit 43 determines whether the CRC result is OK or NG. The relay signal, for which the relay determination unit 43 determines the CRC result is OK, is input to an encoding unit 11. In a case wherein the CRC result for a relay signal is NG, and the relay signal is a signal obtained by synthesizing a relay signal received from the base station unit 200 with the relay signal received from the mobile station unit 100, the relay determination unit 43 issues an instruction to the buffer unit 44 for the transmission of the relay signal. Upon receiving the instruction from the relay determination unit 43 for the transmission of the relay signal, the buffer unit 44 transmits, to a modulating unit 12, the synthesized relay signal that is pre-decoded. Further, when the relay determination unit 43 determines that a relay signal could not be received from the other relay station unit, the relay determination unit 43 issues an instruction to the buffer unit 44 for the transmission of a relay signal. As a detection method, a method for measuring the reception power during a frame period and comparing the power with a threshold, for example, is employed.

Figure 10:
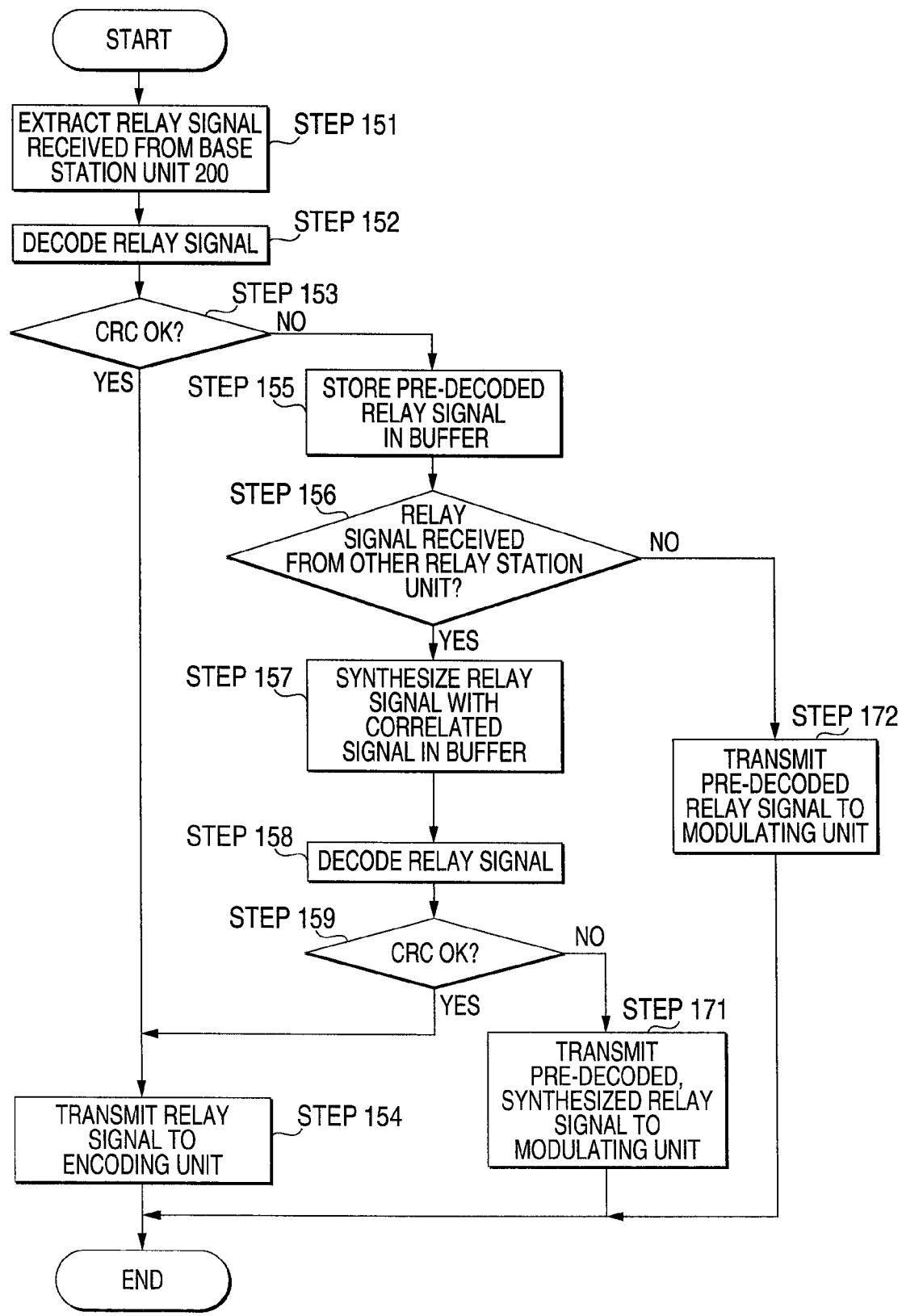
FIG. 10 A flowchart for the relay processor of a relay station unit according to the second embodiment.

FIG. 10 is a flowchart for the relaying processing performed by the relay processing 21 of the relay station unit, as explained using the block diagram. The same reference symbols are provided for the same steps as in FIG. 5, and no further explanation for them will be given.

In a case wherein, at step 156, the relay signal extraction unit 42 can extract a relay signal from the other relay station unit, the process is shifted to step 157. When a relay signal can not be received, the process is shifted to step 172. At step 172, the pre-decoded relay signal that is received from the base station unit 200 and is stored in the buffer is transmitted to the modulating unit 121. Furthermore, at step 159, the relay determination unit 43 performs the CRC for the relay signal. When the CRC result is OK, the process is shifted to step 154. When the CRC result is NG, at step 171, the pre-decoded, synthesized relay signal that is stored in the buffer unit 44 is input to the buffer unit 12.

As described above, in a case wherein NG is the CRC result for the synthesized relay signal, when the synthesized relay signal is transmitted to the mobile station unit 100, the mobile station unit 100 synthesizes the relay signal, so that OK may be obtained as the CRC result. Therefore, the number of retransmissions can be reduced.

It should be noted that in the above described the first and second embodiments, instead of the CRC, another reception quality (e.g., SIR, SINR, SNR, the amount of interference, or the reception power) may be employed for the determination of a relay. When a different reception quality is employed, compared with a case that employs the CRC, there is an advantage in that the reception quality can be measured without the decoding of a data portion being required.

Further, a timing at which the relay station unit transmits a relay signal may be controlled in advance by the base station unit 200 or a higher control station (not shown), so that the relay signal does not overlap a signal the base station unit 200 transmits to the mobile station unit 100.

Furthermore, the synthesizing unit 18 may be employed as a selecting unit for selecting a relay signal having a high reception quality.

In addition, frames have been contiguous in the sequence diagram; however, the frames may not be contiguous, e.g., another frame may be inserted in between them.

Moreover, relay station units are not limited to two, and three or more may be employed.

Also, the base station unit has transmitted a relay signal to a plurality of relay station units in the same frame. However, the base station unit may transmit separate signals in different frames.

Also, the base station unit transmits the same relay signal to a plurality of relay station units. However, different relay signals may be transmitted to the individual relay station units.

Further, the number of times synthesis has been performed by the relay station unit has been only once. However, in a case wherein a plurality of relay station units transmit a relay signal to the mobile station unit at different timings, synthesis may be performed two or more times.

Furthermore, the base station unit and the mobile station unit in the above explanation need only be wireless communication apparatuses, and a signal transmitted by the mobile station unit may be transmitted to the base station unit, or a signal transmitted by the mobile station unit may be transmitted to another mobile station unit.

In addition, an explanation has been given by employing, as an example, a case wherein the relay station unit communicates directly within the base station unit. However, the case is not limited to this, and an additional relay station unit may be located between the relay station unit and the base station unit.

Moreover, in the above individual embodiments, an explanation has been given by employing, as an example, a case wherein the present invention is constituted by using hardware. However, the present invention can be provided using software.

It should be noted that the individual functional blocks employed for the explanation of the above embodiments of are typically obtained as LSIs that are integrated circuits. These may be formed as individual chips, or may be formed as a single chip so that part or the entirety is covered. It should be noted that an LSI is employed here, but depending on differences in the integration density, this may also be called an IC, a system LSI, a super LSI or an ultra LSI.

In addition, the integrated circuit formation method is not limited to the LSI, but is also applicable to a dedicated circuit or to a general-purpose processor that may be employed. An FPGA (Field Programmable Gate Array), which is programmable after an LSI is produced, or a reconfigurable processor, for which the connection and the setup of a circuit cell inside an LSI is reconfigurable, may also be employed.

Moreover, when an integrated circuit technology that is employed in an LSI has appeared as a result of the development of semiconductor technology or another derivative technology, naturally, integration of the functional blocks may be performed using this technology. For example, it is possible that biotechnology may be adapted for use.

The present invention has been explained in detail by referring to the specific embodiments. However, it will be apparent to one having ordinary skill in the art that the present invention can be variously modified or altered, without departing from the spirit and scope of the invention.

The present invention is based on Japanese Patent Application No. 2004-377095, filed on Dec. 27, 2004, and the contents of the application are included as references.

INDUSTRIAL APPLICABILITY

The wireless communication apparatus according to the present invention includes effects for preventing an increase in consumed power during the relaying of a signal, and can be applied for a system that accompanies a relay operation, such as a multi-hop system.

The invention claimed is:

1. A communication apparatus for relaying data, comprising:
a receiving unit which receives first data in a first transmission transmitted by a first communication apparatus and, when the received first data in the first transmission does not satisfy a predetermined reception quality, receives first data in a second transmission transmitted by a second communication apparatus which is different from the first communication apparatus; and
a transmitting unit which transmits a transmission signal generated by combining the received first data in the first transmission with the received first data in the second transmission when the received first data in the first transmission does not satisfy the predetermined reception quality, and transmits the received first data in the first transmission without being combined when the received first data in the first transmission satisfies the predetermined reception quality.

2. A communication apparatus for relaying data, comprising:
a receiving unit which receives first data in a first transmission from a first communication apparatus, the first data being addressed to an intended recipient;
a first determination unit which determines a reception quality of the received first data from the first communication apparatus;
a waiting unit which establishes a waiting period during which first data in a second transmission addressed to the intended recipient is expected to be received by the receiving unit from a second communication apparatus that is different from the first communication apparatus, without issuing a retransmission request to the first communication apparatus in response to a determination by the first determination unit that the received first data from the first communication apparatus comprises an error; and
a transmitting unit which transmits the received first data in the second transmission from the second communication apparatus to be delivered to the intended recipient.

3. A communication apparatus for relaying a signal, comprising:

a receiving unit which receives a first signal comprising data addressed to an intended recipient transmitted from a first communication apparatus and a second signal that also comprises the data addressed to the intended recipient transmitted from a second communication apparatus that is different from the first communication apparatus;

a transmission signal generating unit which generates a transmission signal comprising the data addressed to the intended recipient by combining the received first signal with the received second signal;

a transmitting unit which transmits the generated transmission signal; and a determination unit, which issues an instruction that results in the transmission of the transmission signal by the transmitting unit when the transmission signal does not satisfy a predetermined reception quality, and issues an instruction that results in transmission of the first or second signal by the transmitting unit when the transmission signal satisfies the predetermined reception quality.

4. The communication apparatus according to claim 3, further comprising:

a decoding unit which decodes the transmission signal, and wherein, the determination unit issues an instruction to the transmitting unit to transmit an encoded signal generated with encoding the decoded transmission signal, when the decoded transmission signal has no error, or issues an instruction to the transmitting unit to transmit the transmission signal before decoding, when the decoded transmission signal has an error.

5. The communication apparatus according to claim 1, further comprising:

a determination unit which issues an instruction to the transmitting unit to transmit the received first data in the second transmission only when the received first data in the first transmission satisfies the predetermined reception quality.

6. The communication apparatus according to claim 1, further comprising:

a selecting unit which selects any signal from the received first data in the first transmission and the received first data in the second transmission.

7. The communication apparatus according to claim 1, further comprising:

a selecting unit which compares a reception quality of the received first data in the first transmission with a reception quality of the received first data in the second transmission and selects one of the received first data in the first transmission and the received first data in the second transmission having a greater reception quality.

8. The communication apparatus according to claim 1, wherein a CRC is performed to determine whether the received first data in the first transmission satisfies the predetermined reception quality or not.

9. The communication apparatus according to claim 1, wherein, when the first data in the second transmission transmitted from the second communication apparatus can not be received within a predetermined period, a retransmission request for the first data in the second transmission is issued to the second communication apparatus.

10. The communication apparatus according to claim 1, wherein, when the first data in the second transmission transmitted from the second communication apparatus can not be received within a predetermined period, a transmission instruction is issued to the transmitting unit to transmit the received first data in the first transmission.

11. A communication method in a communication apparatus for relaying data, comprising:

receiving first data in a first transmission from a first communication apparatus, the first data being addressed to an intended recipient;

determining whether the received first data in the first transmission satisfies a predetermined reception quality or not;

in response to a determination that the received first data in the first transmission does not satisfy the predetermined reception quality: (i) receiving first data in a second transmission addressed to the intended recipient transmitted from a second communication apparatus that is different from the first communication apparatus, and (ii) transmitting a transmission signal generated by combining the received first data in the first transmission with the received first data in the second transmission to be delivered to the intended recipient; and in response to a determination that the received first data in the first transmission satisfies the predetermined reception quality, transmitting the received first data in the first transmission without being combined to be delivered to the intended recipient.

12. A communication method in a communication apparatus for relaying data, comprising:

receiving a first signal comprising the data to be relayed to an intended recipient transmitted from a first communication apparatus;

receiving a second signal comprising the data to be relayed to the intended recipient transmitted from a second communication apparatus that is different from the first communication apparatus;

generating a transmission signal comprising the data to be relayed to the intended recipient by combining the received first signal with the received second signal; and when the generated transmission signal does not satisfy a predetermined reception quality, transmitting the generated transmission signal.

13. The wireless communication apparatus according to claim 3, wherein, when the transmission signal does not satisfy the predetermined reception quality continuously a predetermined number of times or more, the determination unit issues a retransmission request.

14. The wireless communication apparatus according to claim 3, wherein, when the transmission signal does not satisfy the predetermined reception quality continuously a predetermined number of times or more, the determination unit issues an instruction to the transmitting unit for transmission of the transmission signal.

15. The communication apparatus according to claim 2, further comprising:

a determination unit which issues an instruction to the transmitting unit to transmit the received first data in the first transmission only when the received first data in the first transmission satisfies the predetermined reception quality.

16. The communication apparatus according to claim 2, wherein a CRC is performed to determine whether the received first data in the first transmission satisfies a predetermined quality or not.

17. The communication apparatus according to claim 3, wherein a CRC is performed to determine whether the transmission signal satisfies the predetermined reception quality.

18. The communication apparatus according to claim 2, wherein, when the first data in the second transmission transmitted from the second communication apparatus can not be received within a predetermined period, a retransmission request for repeated transmission of the first data from the second communication apparatus is issued.

19. The communication apparatus according to claim 3, wherein, when the second signal can not be received from the second communication apparatus within a predetermined period, a retransmission request for repeated transmission of the second signal is issued to the second communication apparatus.

20. The communication apparatus according to claim 2, wherein, when the first data in the second transmission transmitted from the second communication apparatus can not be received within a predetermined period, a transmission instruction is issued to the transmitting unit to transmit the received first data in the first transmission.

21. The communication apparatus according to claim 3, wherein, when the second signal can not be received from the second communication apparatus within a predetermined period, a transmission instruction is issued to the transmitting unit to transmit the received first signal.

* * * * *